United States Patent
Takamatsu (10) Patent No.: US 9,473,867 B2
(45) Date of Patent: Oct. 18, 2016

(54) NOTIFICATION CONTROL DEVICE, NOTIFICATION CONTROL METHOD AND STORAGE MEDIUM

(71) Applicant: SONY CORPORATION, Tokyo (JP)

(72) Inventor: Mikimoto Takamatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 85 days.

(21) Appl. No.: 14/192,289

(22) Filed: Feb. 27, 2014

(65) Prior Publication Data

US 2014/0270199 A1 Sep. 18, 2014

(30) Foreign Application Priority Data

Mar. 12, 2013 (JP) ................. 2013-049054

(51) Int. Cl.
| | |
|---|---|
| H04R 29/00 | (2006.01) |
| H04R 3/00 | (2006.01) |
| H04N 21/81 | (2011.01) |
| H04L 12/18 | (2006.01) |
| H04L 12/58 | (2006.01) |
| H04M 19/04 | (2006.01) |
| H04N 21/472 | (2011.01) |

(52) U.S. Cl.
CPC .......... *H04R 29/004* (2013.01); *H04N 21/814* (2013.01); *H04R 3/005* (2013.01); *H04R 29/005* (2013.01); *H04L 12/1895* (2013.01); *H04L 12/587* (2013.01); *H04M 19/041* (2013.01); *H04N 21/47214* (2013.01)

(58) Field of Classification Search
CPC .. H04R 29/00; H04R 29/005; H04R 29/006; H04R 3/005; H04R 1/08; H04R 2499/11; H04R 3/004; G10L 21/0208; H04M 1/605; H04M 19/041; H04M 1/0262; H04B 3/23; G06F 1/3203; G08B 21/00; H04N 1/00488; H04N 21/47214; H04N 21/814; H04L 12/587; H04L 12/1895

USPC .......... 381/56, 58, 92, 26, 71, 123; 455/575, 455/566, 567; 320/101; 348/62, 231.4, 348/208.15; 713/340; 700/94

See application file for complete search history.

(56) References Cited

U.S. PATENT DOCUMENTS

| | | | |
|---|---|---|---|
| 2002/0010008 A1* | 1/2002 | Bork ................... | H04M 19/041 455/567 |
| 2009/0196429 A1* | 8/2009 | Ramakrishnan ....... | H04R 3/005 381/26 |
| 2011/0109259 A1* | 5/2011 | Choi ................... | H04M 1/0262 320/101 |
| 2011/0117886 A1* | 5/2011 | Travis ............... | H04M 3/42221 455/412.2 |
| 2011/0216179 A1* | 9/2011 | Dialameh .......... | G06F 17/30247 348/62 |
| 2011/0317848 A1* | 12/2011 | Ivanov .................. | H04R 3/005 381/94.2 |
| 2014/0126736 A1* | 5/2014 | Gauger, Jr. .......... | G10K 11/178 381/71.6 |
| 2015/0304786 A1* | 10/2015 | Partio ................. | H04R 29/005 381/58 |

* cited by examiner

*Primary Examiner* — Vivian Chin
*Assistant Examiner* — Ubachukwu Odunukwe
(74) *Attorney, Agent, or Firm* — Chip Law Group (57) ABSTRACT

There is provided a notification control device including a determination unit configured to determine whether a sound collection unit configured to collect voice in a microphone is blocked, and a notification controller configured to cause, when it is determined that the sound collection unit of the microphone is blocked, a determination result to be reported to a user. When a voice signal indicating the voice collected by the microphone is recorded, the notification controller causes the determination result to be reported to the user in one or more notification ways not including an auditory notification way. When the voice signal is not recorded, the notification controller causes the determination result to be reported to the user in one or more notification ways from among one or more notification ways including the auditory notification way.

12 Claims, 3 Drawing Sheets

| | | D | E | F | G |
|---|---|---|---|---|---|
| | OPERATION MODE | DISPLAY (PANEL) | VOICE (LOUDSPEAKER) | VIBRATION (VIBRATOR) | AUTOMATIC MONAURAL RECORDING |
| A | CAPTURED IMAGE DISPLAY (NO RECORDING) | OK | OK | OK | N/A |
| B | IN RECORDING (AUTOMATIC) | DETERMINE BASED ON IMAGE CAPTURING MODE | DETERMINE BASED ON IMAGE CAPTURING MODE | DETERMINE BASED ON IMAGE CAPTURING MODE | DETERMINE BASED ON USER SETTING OR IMAGE CAPTURING MODE |
| B / IN RECORDING | PERSON IMAGE CAPTURING (FACE DETECTION) | OK | NG | OK | OK |
| B / IN RECORDING | SCENERY IMAGE CAPTURING MODE | OK | NG | OK | OK |
| B / IN RECORDING | UNDERWATER | OK | NG | NG | OK |
| B / IN RECORDING | MACRO MODE | OK | NG | NG | OK |
| B / IN RECORDING | IN ZOOMING | OK | NG | NG | OK |
| B / IN RECORDING | NIGHT IMAGE CAPTURING (NO PERSON) | OK | NG | NG | OK |
| B / IN RECORDING | SILENT PLACE | OK | NG | NG | OK |
| B / IN RECORDING | UNDER SPOTLIGHTING | OK | NG | NG | OK |
| C | IC RECORDER FUNCTION (NO PANEL) | N/A | NG | OK | OK |

FIG. 1

| | | OPERATION MODE | DISPLAY (PANEL) | VOICE (LOUDSPEAKER) | VIBRATION (VIBRATOR) | AUTOMATIC MONAURAL RECORDING |
|---|---|---|---|---|---|---|
| A | | CAPTURED IMAGE DISPLAY (NO RECORDING) | OK | OK | OK | N/A |
| B | IN RECORDING | IN RECORDING (AUTOMATIC) | DETERMINE BASED ON IMAGE CAPTURING MODE | DETERMINE BASED ON IMAGE CAPTURING MODE | DETERMINE BASED ON IMAGE CAPTURING MODE | DETERMINE BASED ON USER SETTING OR IMAGE CAPTURING MODE |
| B | IN RECORDING | PERSON IMAGE CAPTURING (FACE DETECTION) | OK | NG | OK | OK |
| B | IN RECORDING | SCENERY IMAGE CAPTURING MODE | OK | NG | OK | OK |
| B | IN RECORDING | UNDERWATER | OK | NG | NG | OK |
| B | IN RECORDING | MACRO MODE | OK | NG | NG | OK |
| B | IN RECORDING | IN ZOOMING | OK | NG | NG | OK |
| B | IN RECORDING | NIGHT IMAGE CAPTURING (NO PERSON) | OK | NG | NG | OK |
| B | IN RECORDING | SILENT PLACE | OK | NG | NG | OK |
| B | IN RECORDING | UNDER SPOTLIGHTING | OK | NG | OK | OK |
| C | | IC RECORDER FUNCTION (NO PANEL) | N/A | NG | OK | OK |

NOTIFICATION CONTROL DEVICE, NOTIFICATION CONTROL METHOD AND STORAGE MEDIUM

CROSS REFERENCE TO RELATED APPLICATIONS

This application claims the benefit of Japanese Priority Patent Application JP 2013-049054 filed Mar. 12, 2013, the entire contents of which are incorporated herein by reference.

BACKGROUND

The present disclosure relates to a notification control device, a notification control method and a storage medium.

A technology is being developed for detecting the case where a microphone is blocked during the use of a device and warning the user thereof. Examples of the technology for detecting the case where a microphone is blocked during the use of a device and warning the user thereof include, for example, a technology disclosed in National Publication of International Patent Application No. 2011-512732 (hereinafter referred to as Patent Literature 1).

SUMMARY

In a technology, for example, disclosed in Patent Literature 1 for detecting the case where a microphone is blocked during the use of a device and warning the user thereof (hereinafter referred to simply as "existing technology"), the case where the microphone is blocked is detected and a warning signal is generated. Then, in the existing technology, the warning based on the warning signal is performed with at least one of voice, vibration of the device and visual display. Therefore, in the case where the existing technology is used, there is some possibility in which the case where the microphone is blocked is reported to the user during the use of the device.

Herein, when the case where the microphone is blocked with a finger or the like of the user is reported to the user, there can be an undesirable notification way. However, in the existing technology, for example, there is no consideration to the above-mentioned case where an undesirable notification way can exist. Accordingly, when the existing technology is used, for example, there is a risk that reporting the case where the microphone is blocked to the user during the use of the device all the more causes the user inconvenience. Therefore, convenience of the user is not necessarily to be able to be improved still when the existing technology is used, for example.

It is desirable to propose a notification control device, a notification control method and a storage medium which are novel and enhanced and can improve convenience of the user.

According to an embodiment of the present disclosure, there is provided a notification control device including a determination unit configured to determine whether a sound collection unit configured to collect voice in a microphone is blocked, and a notification controller configured to cause, when it is determined that the sound collection unit of the microphone is blocked, a determination result to be reported to a user. When a voice signal indicating the voice collected by the microphone is recorded, the notification controller causes the determination result to be reported to the user in one or more notification ways not including an auditory notification way. When the voice signal is not recorded, the notification controller causes the determination result to be reported to the user in one or more notification ways from among one or more notification ways including the auditory notification way.

According to an embodiment of the present disclosure, there is provided a notification control method including determining whether a sound collection unit configured to collect voice in a microphone is blocked, and causing, when it is determined that the sound collection unit of the microphone is blocked, a determination result to be reported to a user. In the step of causing the determination result to be reported, when a voice signal indicating the voice collected by the microphone is recorded, the determination result is caused to be reported to the user in one or more notification ways not including an auditory notification way, and when the voice signal is not recorded, the determination result is caused to be reported to the user in one or more notification ways from among one or more notification ways including the auditory notification way.

According to an embodiment of the present disclosure, there is provided a program for causing a computer to execute determining whether a sound collection unit configured to collect voice in a microphone is blocked, and causing, when it is determined that the sound collection unit of the microphone is blocked, a determination result to be reported to a user. In the step of causing the determination result to be reported, when a voice signal indicating the voice collected by the microphone is recorded, the determination result is caused to be reported to the user in one or more notification ways not including an auditory notification way, and when the voice signal is not recorded, the determination result is caused to be reported to the user in one or more notification ways from among one or more notification ways including the auditory notification way.

According to an embodiment of the present disclosure, convenience of the user can be improved.

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereafter, the description is made in the following order.
1. Notification Control Method According to Embodiment
2. Notification Control Device According to Embodiment
3. Program According to Embodiment (Notification Control Method According to Embodiment)

Before a configuration of a notification control device according to an embodiment is described, first, a notification control method according to an embodiment will be described. Hereafter, the notification control method according to the embodiment is described, exemplified by a notification control device according to the embodiment performing processing according to the notification control method according to the embodiment.

Summary of Notification Control Method According to Embodiment

Various devices such, for example, as an image capturing device such as a digital still camera and a digital video camera, a communication device having a communication function such as a smart phone, and a voice recording device such as an IC recorder exist which devices can process voice signals indicating voice collected by a microphone included in the device or an external microphone connected to the device. Hereafter, there is sometimes a case where the microphone included in the device and the external microphone connected to the device are collectively referred to as "microphones".

As one example, in a case where the user captures an image using an image capturing device as mentioned above, the user can hold the image capturing device in various ways depending on, for example, an image capturing style or the like during the image capturing. Therefore, while the user is capturing the image, a microphone included in the image capturing device or an external microphone connected to the image capturing device can be blocked with a user's finger or the like. Moreover, the "case where the microphone is blocked with a user's finger or the like" as mentioned above can also take place for various devices such, for example, as the above-mentioned communication device and the above-mentioned voice recording device.

When the "case where the microphone is blocked with a user's finger or the like" takes place, an undesirable case where the voice collected by the microphone is difficult to be recorded or the voice collected by the microphone is contaminated by noise, for example, can take place. Moreover, when such an undesirable case as mentioned above takes place, convenience of the user can deteriorate.

Herein, examples of a measure for preventing deterioration of convenience of the user due to such an undesirable case as mentioned above taking place include, for example, reporting the case where the microphone is blocked to the user like the existing technology disclosed in Patent Literature 1. Reporting the case where the microphone is blocked to the user enables the user to recognize the case where the microphone is blocked, and also, to perform operation of changing the state where the microphone is blocked to the state where the microphone is not blocked. Therefore, reporting the case where the microphone is blocked to the user enables, for example, the undesirable case as mentioned above to be prevented from taking place and influence of the undesirable case as mentioned above to be reduced.

However, when reporting the case where the microphone is blocked to the user as mentioned above, there can be an undesirable notification way. Specific examples of the above-mentioned undesirable notification way include, for example, auditorily reporting the case where the microphone is blocked to the user with voice (including beeping sound and music; this also applies hereafter) while processing according to recording of a voice signal corresponding to the voice collected by the microphone is being performed in the device such as an image capturing device. When the case where the microphone is blocked is reported to the user with voice while processing according to recording of the voice signal is being performed, since the voice indicated by the recorded voice signal can include the voice according to the notification, reporting the case where the microphone is blocked to the user can all the more cause the user inconvenience. Moreover, causing the user inconvenience is far from improving convenience of the user.

Therefore, the notification control device according to the embodiment determines, for example, whether a sound collection unit collecting voice in the microphone is blocked (determination processing) as processing according to the notification control method according to the embodiment. Specific examples of the determination processing according to the embodiment are described later.

Moreover, the notification control device according to the embodiment causes, for example, the determination result to be reported to the user (notification control processing) as processing according to the notification control method according to the embodiment when it is determined that the sound collection unit of the microphone is blocked. The notification control device according to the embodiment changes the notification way of the determination result depending on the case where the voice signal indicating the voice collected by the microphone (hereafter sometimes simply referred to as "voice signal") is recorded or the case where the voice signal is not recorded in the notification control processing. Herein, the determination result which the notification control device according to the embodiment causes to be reported is the determination result in the case where it is determined that the sound collection unit of the microphone is blocked. In other words, the notification which the notification control device according to the embodiment causes to be performed corresponds to notification indicating the case where the sound collection unit of the microphone is blocked.

Herein, examples of the microphone according to the embodiment include, for example, microphones of any types such as a dynamic (or electrodynamic) microphone and a condenser (or electrostatic) microphone which can collect voice to generate a voice signal indicating the collected voice. Moreover, examples of the sound collection unit according to the embodiment include, for example, structural portions according to sound collection in the microphone such as a portion including a diaphragm (vibration plate) in the microphone.

Moreover, examples of the microphone according to the embodiment include, for example, a microphone included in the notification control device according to the embodiment, whereas the microphone according to the embodiment is not limited to the above. For example, the microphone according to the embodiment may be an external device of the notification control device according to the embodiment such as a microphone connected to the notification control device according to the embodiment, a microphone included in an external device communicable with the notification control device according to the embodiment, and a microphone connected to the external device.

More specifically, when a voice signal, for example, is recorded in the notification control processing according to the embodiment, the notification control device according to the embodiment causes the determination result in the determination processing to be reported to the user in one or more notification ways not including an auditory notification way. In the above-mentioned case, the notification control device according to the embodiment causes the determination result to be reported to the user, for example, in a "visual notification way" of displaying according to the notification according to the embodiment such as displaying an image or characters on a display screen and lighting a lamp, and/or a "tactile notification way" of vibrating according to the notification such as vibrating a vibrator. In other words, when the voice signal is recorded, the notification control device according to the embodiment does not cause the determination result to be reported to the user in the auditory notification way.

Moreover, when a voice signal, for example, is not recorded in the notification control processing according to the embodiment, the notification control device according to the embodiment causes the determination result in the determination processing to be reported to the user in one or more notification ways from among one or more notification ways including the auditory notification way. In the above-mentioned case, the notification control device according to the embodiment causes the determination result to be reported to the user, for example, in one or more notification ways from among the "auditory notification way" of outputting voice, the "visual notification way" of displaying according to the notification according to the embodiment, and the "tactile notification way" of vibrating a vibrator or the like.

Herein, examples of the device according to the notification control processing according to the embodiment which device is a target for determination of whether or not the voice signal is recorded (hereinafter sometimes referred to as "target device") include, for example, the notification control device according to the embodiment and an external device of the notification control device according to the embodiment. The notification control device according to the embodiment employs, for example, a device performing the processing according to recording of the voice signal according to the embodiment as the target device according to the embodiment.

For example, when the notification control device according to the embodiment is a device performing the processing according to recording of the voice signal according to the embodiment, the notification control device according to the embodiment determines whether or not the voice signal according to the notification control processing according to the embodiment is recorded on the basis of the state (for example, an operation mode mentioned later) of its own device (notification control device according to the embodiment). Moreover, for example, when an external device of the notification control device according to the embodiment is a device performing the processing according to recording of the voice signal according to the embodiment, the notification control device according to the embodiment determines whether or not the voice signal according to the notification control processing according to the embodiment is recorded on the basis of information indicating the state of the external device (for example, data indicating the operation mode mentioned later) which information is acquired from the external device.

Moreover, when the notification control device according to the embodiment causes the determination result to be reported to the user in the "visual notification way", the notification control device according to the embodiment causes, for example, a display unit (mentioned later) included in its own device (notification control device according to the embodiment) or an external display device to perform display according to the notification. To the display unit (mentioned later) included in its own device (notification control device according to the embodiment), the notification control device according to the embodiment delivers, for example, a signal for causing the display unit to perform the display according to the notification, and thereby, causes the display unit (mentioned later) to perform the display according to the notification. Moreover, to the external display device, the notification control device according to the embodiment transmits, for example, a signal for causing the external display device to perform the display according to the notification via a communication unit (mentioned later) or a connected external communication device, and thereby, causes the external display device to perform the display according to the notification.

Herein, examples of the signal for the performance of the display according to the notification according to the embodiment include, for example, a signal indicating data according to the display content of image data, character data and the like or control data for lighting a lamp. Moreover, when the external display device is caused to perform the display according to the notification, the notification control device according to the embodiment may further transmit, for example, a control signal for controlling the display in the external display device.

Moreover, when the notification control device according to the embodiment causes the determination result to be reported to the user in the "tactile notification way", the notification control device according to the embodiment causes, for example, a vibration unit (mentioned later) included in its own device (notification control device according to the embodiment) or an external vibration device such as a vibrator to perform vibration according to the notification. The notification control device according to the embodiment delivers, for example, a signal for the performance of the vibration according to the notification to the vibration unit (mentioned later) included in its own device (notification control device according to the embodiment), and thereby, causes the vibration unit (mentioned later) to perform the vibration according to the notification. Moreover, the notification control device according to the embodiment transmits, for example, a signal for the performance of the vibration according to the notification to the external vibration device via the communication unit (mentioned later) or the connected external communication device, and thereby, causes the external vibration device to perform the vibration according to the notification.

Herein, examples of the signal for the performance of the vibration according to the notification according to the embodiment include, for example, a control signal for controlling vibration in a vibration device such as a vibrator.

Moreover, when the notification control device according to the embodiment causes the determination result to be reported to the user in the "auditory notification way", the notification control device according to the embodiment causes, for example, a voice output unit (mentioned later) included in its own device (notification control device according to the embodiment), an external voice output device or the like to output the voice according to the notification. The notification control device according to the embodiment delivers, for example, a voice signal indicating the voice according to the notification to the voice output unit (mentioned later) included in its own device (notification control device according to the embodiment), and thereby, causes the voice output unit (mentioned later) to output the voice according to the notification. Moreover, the notification control device according to the embodiment transmits, for example, the voice signal indicating the voice according to the notification to the external voice output device via the communication unit (mentioned later) or the connected external communication device, and thereby, causes the external voice output device to output the voice according to the notification. In addition, when the external voice output device is caused to output the voice according to the notification, the notification control device according to the embodiment may further transmit, for example, a control signal for controlling the output of the voice in the external voice output device.

In addition, specific examples of the notification control processing according to the embodiment are described later.

The notification control device according to the embodiment performs, for example, (1) determination processing and (2) notification control processing as the processing according to the notification control method according to the embodiment.

Herein, in the notification control processing according to the embodiment, when it is determined that the sound collection unit of the microphone is blocked in the determination processing according to the embodiment, the notification control device according to the embodiment causes the determination result to be reported to the user. When it is determined that the sound collection unit of the microphone is blocked, the notification control device according to the embodiment causes the determination result to be reported to the user, and thereby, the user, for example, can recognize the case where the microphone is blocked and can perform operation of changing the state where the microphone is blocked to the state where the microphone is not blocked.

Therefore, that the notification control device according to the embodiment performs the processing according to the notification control method according to the embodiment enables, for example, the above-mentioned undesirable case to be prevented from taking place and influence of the above-mentioned undesirable case to be reduced.

Moreover, the notification control device according to the embodiment changes the notification way depending on the case where the voice signal is recorded or the case where the voice signal is not recorded. More specifically, when the voice signal is recorded, the notification control device according to the embodiment does not cause the determination result to be reported to the user in the auditory notification way. Therefore, when the notification control device according to the embodiment performs the notification, since it is prevented that the voice indicated by the recorded voice signal is contaminated by the voice according to the notification, there is not a risk that reporting the case where the microphone is blocked to the user all the more causes the user inconvenience.

Accordingly, the notification control device according to the embodiment performs the processing according to the notification control method according to the embodiment, and thereby, can improve convenience of the user.

Processing According to Notification Control Method According to Embodiment

Next, the processing according to the notification control method according to the embodiment is exemplarily described more in detail.

(1) Determination Processing

The notification control device according to the embodiment determines whether the sound collection unit collecting the voice in the microphone is blocked.

(1-1) First Example of Determination Processing

The notification control device according to the embodiment determines whether the sound collection unit of the microphone is blocked, for example, on the basis of the voice signal indicating the voice collected by the microphone.

Herein, when the notification control device according to the embodiment includes the microphone, examples of the voice signal used by the notification control device according to the embodiment for the determination processing include, for example, a voice signal delivered from the included microphone. Moreover, when the notification control device according to the embodiment does not include the microphone, examples of the voice signal used by the notification control device according to the embodiment for the determination processing include, for example, a voice signal which is transmitted from the external device and is received by the communication unit (mentioned later). In addition, still when the notification control device according to the embodiment includes the microphone, the notification control device according to the embodiment may be able to use, for example, the voice signal transmitted from the external device for the determination processing.

For example, the notification control device according to the embodiment determines whether or not a voice pattern corresponding to sound arising when the sound collection unit of the microphone is blocked is contained in the voice indicated by the acquired voice signal. The notification control device according to the embodiment determines whether or not the voice pattern corresponding to sound arising when the sound collection unit of the microphone is blocked is contained in the voice indicated by the acquired voice signal, for example, using data indicating the voice pattern or the like (for example, waveform data or the like) which data is stored in a storage (mentioned later) or an external recording medium. Herein, examples of the external recording medium according to the embodiment include, for example, a recording medium connected to the communication control device according to the embodiment and a recording medium included in an external device such as a server communicable with the communication control device according to the embodiment.

When the microphone according to the embodiment has one sound collection unit for monaural playback or monophonic playback, the notification control device according to the embodiment determines whether or not the voice pattern corresponding to sound arising when the sound collection unit of the microphone is blocked is contained in the voice indicated by the voice signal with respect to the voice signal corresponding to the voice collected by the sound collection unit. Moreover, for example, when the microphone according to the embodiment has two sound collection units collecting the voice for stereophonic playback, the notification control device according to the embodiment determines whether or not the voice pattern corresponding to sound arising when the sound collection unit of the microphone is blocked is contained in the voice indicated by the voice signal with respect to each of voice signals corresponding to voices collected by the respective two sound collection units. Furthermore, for example, when the microphone according to the embodiment has three or more sound collection units, the notification control device according to the embodiment determines whether or not the voice pattern corresponding to sound arising when the sound collection unit of the microphone is blocked is contained in the voice indicated by the voice signal with respect to each of voice signals corresponding to voices collected by the respective sound collection units.

Then, when the sound arising when the sound collection unit of the microphone is blocked is contained in the voice indicated by the acquired voice signal, the notification control device according to the embodiment determines that the sound collection unit of the microphone is blocked.

As mentioned above, the notification control device according to the embodiment can determine whether or not the voice pattern corresponding to sound arising when the sound collection unit of the microphone is blocked is contained in the voice indicated by the voice signal with respect to each of the voice signals corresponding to the voices collected by the respective sound collection units included in the microphone. Therefore, when the microphone according to the embodiment has a plurality of sound collection units, the notification control device according to the embodiment can further determine, for example, which sound collection unit included in the microphone according to the embodiment is blocked.

In addition, the determination processing according to the first example in the notification control device according to the embodiment is not limited to the above example.

For example, when the microphone according to the embodiment has two sound collection units collecting the voice for stereophonic playback, the notification control device according to the embodiment compares the levels of voice signals corresponding to voices collected by the respective two sound collection units (for example, represented in [dB]) with each other. Then, for example, when the difference in level between the voice signals is larger than a set threshold (or equal to or greater than the set threshold), the notification control device according to the embodiment determines that any of the sound collection units in the microphone is blocked.

Herein, when the acquired voice signals are analog signals, the notification control device according to the embodiment performs, for example, time integration on the voice signals in an integration circuit, and after that, compares the levels of the voice signals with each other in a comparison operation circuit. Herein, in the above-mentioned example, the above-mentioned threshold is determined, for example, according to the setting of the comparison operation circuit. The setting of the comparison operation circuit may be fixed setting which is beforehand set or variable setting which can be set again by user operation or the like.

Then, the notification control device according to the embodiment determines whether or not the sound collection unit of the microphone is blocked, for example, on the basis of a signal outputted from the comparison operation circuit (high level signal/low level signal).

In addition, the processing in the case where the acquired voice signals are analog signals is not limited to the above example. For example, the notification control device according to the embodiment may convert the acquired voice signals into digital signals with an ADC (Analog-to-Digital Converter), and after that, determine whether or not the sound collection unit of the microphone is blocked using the integration circuit and the comparison operation circuit.

Moreover, when the acquired voice signals are digital signals, for example, similarly to the case where the acquired voice signals are analog signals, the notification control device according to the embodiment determines whether or not the sound collection unit of the microphone is blocked using the integration circuit and the comparison operation circuit.

(1-2) Second Example of Determination Processing

The notification control device according to the embodiment determines whether or not the sound collection unit of the microphone is blocked on the basis of a detection signal of a sensor capable of detecting an object body close to the sound collection unit of the microphone according to the embodiment. Herein, examples of the sensor capable of detecting an object body close to the sound collection unit according to the embodiment include, for example, a proximity sensor included in the microphone according to the embodiment, such as an infrared proximity sensor, and a proximity sensor connected to the microphone according to the embodiment. The notification control device according to the embodiment uses, for example, a detection signal delivered from the included sensor or a detection signal transmitted from the external device, for the determination processing.

For example, when detection data according to the embodiment indicates that an object body close to the sound collection unit of the microphone according to the embodiment is detected, the sound collection unit of the microphone according to the embodiment is blocked with a finger (one example of the object body) or the like, or can be blocked with a finger (one example of the object body) or the like in high possibility. Therefore, for example, when the detection data according to the embodiment indicates that the object body close to the sound collection unit of the microphone according to the embodiment is detected, the notification control device according to the embodiment determines that the sound collection unit of the microphone is blocked.

(1-3) Another Example of Determination Processing

Incidentally, the determination processing according to the embodiment is not limited to the determination processing according to the above-mentioned first example and the determination processing according to the above-mentioned second example. For example, the notification control device according to the embodiment may perform, as the determination processing according to the embodiment, processing according to any method allowing the determination of whether the sound collection unit of the microphone is blocked such as a method using a noise floor estimation value and/or a power estimation value estimated from the acquired voice signal.

(2) Notification Control Processing

When it is determined that the sound collection unit of the microphone is blocked in the above-mentioned processing of item (1) (determination processing), the notification control device according to the embodiment causes the determination result to be reported to the user. When the voice signal indicating the voice collected by the microphone is recorded, the notification control device according to the embodiment causes the determination result to be reported to the user in one or more notification ways not including the auditory notification way. Moreover, when the voice signal is not recorded, the notification control device according to the embodiment causes the determination result to be reported to the user in one or more notification ways from among one or more notification ways including the auditory notification way.

More specifically, the notification control device according to the embodiment determines, for example, whether the target device according to the embodiment (device as a target of determination of whether or not the voice signal is recorded) is in a first operation mode in which the voice signal is recorded or in a second operation mode in which the voice signal is not recorded. When being in the first operation mode is determined, the notification control device according to the embodiment causes the determination result to be reported to the user in one or more notification ways not including the auditory notification way. Moreover, when being in the second operation mode is determined, the notification control device according to the embodiment causes the determination result to be reported to the user in one or more notification ways from among one or more notification ways including the auditory notification way.

Herein, the operation mode according to the embodiment is, for example, an operation format indicating which functions the target device according to the embodiment activates and operates from among its own functions. For example, when the target device according to the embodiment is an image capturing device having an image capturing function using its own image capturer or a connected external image capturer, examples of the operation mode according to the embodiment include image capturing modes in which parameters and the like according to image capturing are set.

The operation mode according to the embodiment is managed, for example, with flags in the target device according to the embodiment. The notification control device according to the embodiment acquires, for example, flag data corresponding to each operation mode from the target device according to the embodiment, and thereby, specifies the operation mode in the target device according to the embodiment. In addition, in the target device according to the embodiment, it goes without saying that processing for specifying the operation mode in the target device according to the embodiment is not limited to the processing using the flag data.

Hereafter, the notification control processing according to the embodiment is described, mainly exemplified by the target device according to the embodiment being an image capturing device. In addition, the target device according to the embodiment is not limited to the image capturing device. For example, the target device according to the embodiment may be a device such as a voice recording device such as an IC recorder in which voice signals are recorded.

When the target device according to the embodiment is the image capturing device, examples of the first operation mode according to the embodiment include, for example, one or more image capturing modes in which a voice signal is recorded along with an image signal indicating a captured image captured by an image capturer. In addition, the first operation mode according to the embodiment is not limited to the above example. For example, the examples of the first operation mode according to the embodiment may include a voice recording mode in which only the voice signal is recorded. Moreover, one example of the image capturing modes corresponding to the first operation mode according to the embodiment is described later.

When any of the image capturing modes in which the voice signal is recorded along with the image signal is set, for example, the notification control device according to the embodiment determines being in the first operation mode. Moreover, when the voice recording mode is set, for example, the notification control device according to the embodiment determines being in the first operation mode.

When the target device according to the embodiment is the image capturing device, examples of the second operation mode according to the embodiment include, for example, operation modes in which the operation state where the captured image is not recorded while image capturing is performed by the image capturer (operation state where a so-called through image is displayed on a display screen) is realized. In addition, the second operation mode according to the embodiment is not limited to the above. The examples of the second operation mode according to the embodiment include any operation modes in which the voice signal is not recorded.

(2-1) First Example of Notification Control Processing: First Example of Notification Control Processing in Case where being in First Operation Mode is Determined For example, when any of the image capturing modes in which the voice signal is recorded along with the image signal is set, the notification control device according to the embodiment determines being in the first operation mode. Then, the notification control device according to the embodiment causes the determination result to be reported to the user according to the notification way corresponding to the set image capturing mode.

More specifically, the notification control device according to the embodiment uses, for example, a table, a database or the like in which the operation modes are associated with the notification ways, and thereby, specifies the notification way corresponding to the set operation mode. Then, the notification control device according to the embodiment causes the determination result to be reported to the user in the specified notification way.

Figure 1:
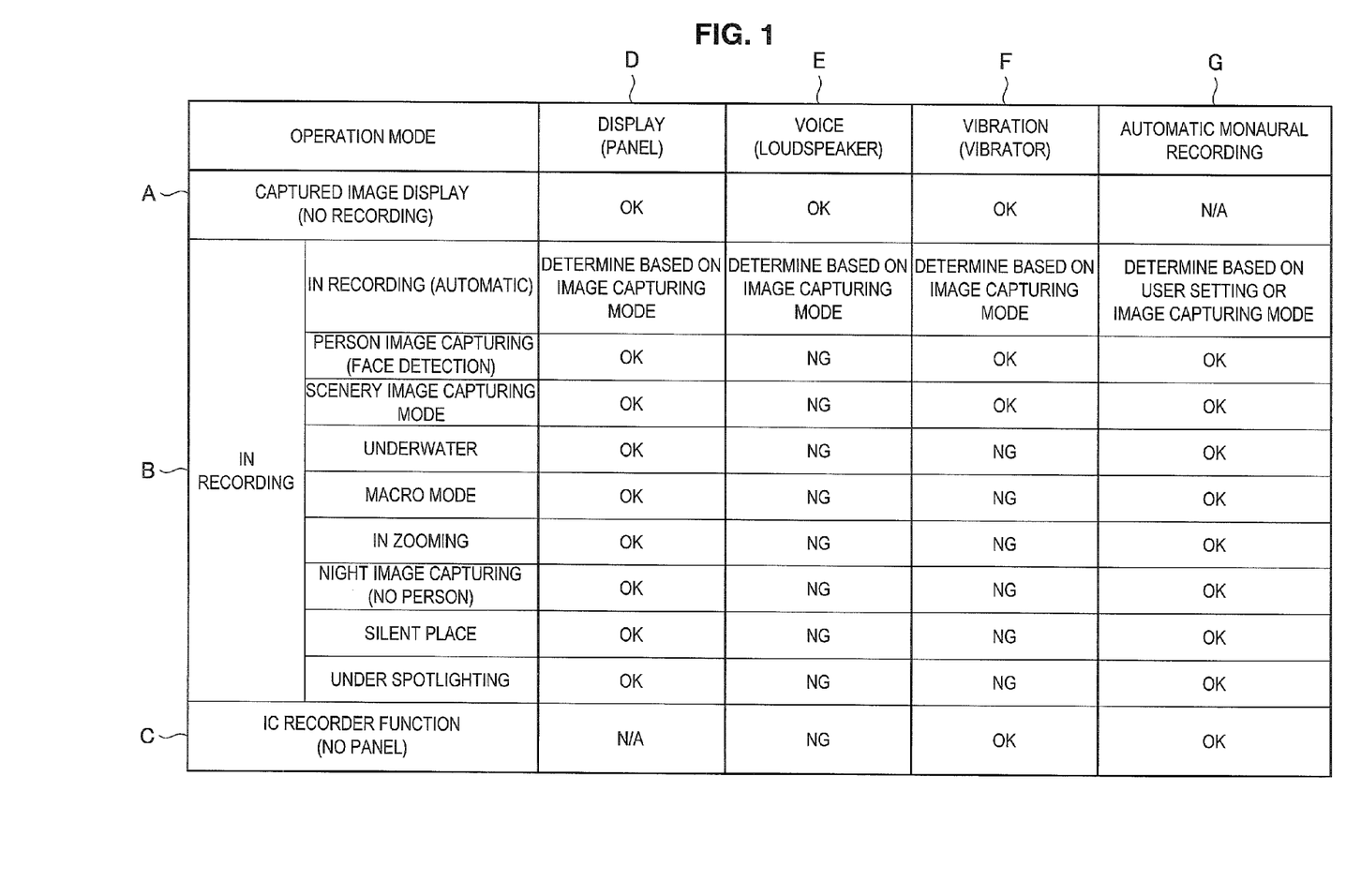
FIG. 1 is an explanatory drawing for explaining one example of notification control processing in a notification control device according to an embodiment.

FIG. 1 is an explanatory drawing for explaining one example of the notification control processing in the notification control device according to the embodiment and shows one example of a table used in the case where the notification control device according to the embodiment determines the notification way corresponding to the set operation mode.

Herein, item A shown in FIG. 1 shows one example of the operation mode in which the operation state where the image capturing is performed by the image capturer while the captured image is not recorded is realized, that is, the operation mode which is determined as being the second operation mode according to the embodiment.

Moreover, item B shown in FIG. 1 shows one example of the image capturing modes in which the voice signal is recorded along with the image signal, that is, one example of the operation modes which are determined as being the first operation mode according to the embodiment. Herein, "in recording (automatic)" shown in item B of FIG. 1 indicates an automatic setting mode in which one image capturing mode is automatically set from among a plurality of image capturing modes. Moreover, "person image capturing (face detection)" shown in item B of FIG. 1 indicates one example of a person image capturing mode in which an image of a person is captured, and "scenery image capturing mode" shown in item B of FIG. 1 indicates one example of a scenery image capturing mode in which an image of scenery is captured. Moreover, "underwater", "macro mode", "in zooming" (operation mode in which zooming operation is performed based on the user's manipulation), "night image capturing (no person)", "silent place" and "under spotlighting" shown in item B of FIG. 1 indicate one example of image capturing modes which are not any of the person image capturing mode in which an image of a person is captured and the scenery image capturing mode in which an image of scenery is captured.

Moreover, item C shown in FIG. 1 indicates one example of the voice recording mode, that is, another example of the operation mode which is determined as being the first operation mode according to the embodiment.

Moreover, item D shown in FIG. 1 indicates whether or not the determination result is caused to be reported to the user in the "visual notification way" in each operation mode, and item E shown in FIG. 1 indicates whether or not the determination result is caused to be reported to the user in the "auditory notification way" in each operation mode. Moreover, item F shown in FIG. 1 indicates whether or not the determination result is caused to be reported to the user in the "tactile notification way" in each operation mode. Herein, "OK" shown in FIG. 1 indicates that the notification is possible and "NG" shown in FIG. 1 indicates that the notification is not possible. Moreover, "N/A" shown in FIG. 1 indicates, for example, that the relevant function is not included.

Moreover, item G shown in FIG. 1 indicates, for example, whether or not, when the microphone according to the embodiment includes two sound collection units for stereophonic playback and it is determined that one sound collection unit thereof is blocked, a voice signal corresponding to voice collected by the other sound collection unit which is not blocked is automatically recorded as a voice signal for monaural playback (or monophonic playback; this also applies hereafter).

The notification control device according to the embodiment uses, for example, a table as shown in FIG. 1, and thereby, specifies the notification way corresponding to the set operation mode and causes the determination result to be reported to the user in the specified notification way.

For example, when the set image capturing mode is the person image capturing mode in which an image of a person is captured or the scenery image capturing mode in which an image of scenery is captured like "person image capturing (face detection)" or "scenery image capturing mode" shown in item B of FIG. 1, the notification control device according to the embodiment causes the determination result to be reported to the user in the visual notification way and/or in the tactile notification way with vibration.

Moreover, for example, when the set image capturing mode is not any image capturing mode of the person image capturing mode in which an image of a person is captured and the scenery image capturing mode in which an image of scenery is captured like "underwater", "macro mode", "in zooming", "night image capturing (no person)", "silent place" and "under spotlighting" shown in item B of FIG. 1, the notification control device according to the embodiment causes the determination result to be reported to the user in the visual notification way.

Moreover, for example, when the set image capturing mode is the automatic setting mode like "in recording (automatic)" shown in item B of FIG. 1, the notification control device according to the embodiment selects, for example, one image capturing mode from among the plurality of image capturing modes on the basis of one or more of a captured image indicated by the image signal, information regarding an image capturing environment in which image capturing is performed by the image capturer, and a signal level of the voice signal. Then, the notification control device according to the embodiment causes the determination result to be reported to the user in the notification way corresponding to the selected one image capturing mode.

Herein, examples of the information regarding the image capturing environment according to the embodiment include, for example, detection data indicating an illuminance value detected by an illuminance sensor. In addition, the information regarding the image capturing environment according to the embodiment is not limited to the above. For example, the information regarding the image capturing environment according to the embodiment may be detection data indicating a detection value of another sensor such as detection data indicating a brightness value detected by a brightness sensor. Hereafter, the information regarding the image capturing environment according to the embodiment is exemplified by the detection data indicating the illuminance value.

For example, when the acquired image signal is used, the notification control device according to the embodiment selects the image capturing mode on the basis of the subject included in the captured image indicated by the image signal. For example, when a person is included in the captured image as the subject, the notification control device according to the embodiment selects "person image capturing (face detection)" shown in item B of FIG. 1. Moreover, for example, when the acquired information regarding the image capturing environment is the detection data indicating the illuminance value, the notification control device according to the embodiment selects, for example, "under spotlighting" shown in item B of FIG. 1 in the case where the illuminance value indicated by the information regarding the image capturing environment is equal to or greater than a set corresponding threshold (or greater than the corresponding threshold). Moreover, for example, when the acquired voice signal is used, the notification control device according to the embodiment selects "silent place" shown in item B of FIG. 1, for example, in the case where the signal level of the voice signal is equal to or smaller than a set corresponding threshold (or smaller than the corresponding threshold).

Moreover, for example, when no person is included as the subject in the captured image indicated by the acquired image signal and the illuminance value indicated by the acquired information regarding the image capturing environment is equal to or smaller than a set corresponding threshold (or smaller than the corresponding threshold), "night image capturing (no person)" shown in item B of FIG. 1 is selected. Moreover, for example, when the illuminance value indicated by the acquired information regarding the image capturing environment is equal to or greater than a set corresponding threshold (or greater than the corresponding threshold) and the signal level of the voice signal is equal to or greater than a set corresponding threshold (or greater than the corresponding threshold), "scenery image capturing mode" shown in item B of FIG. 1 is selected.

When the set image capturing mode is the automatic setting mode like "in recording (automatic)" shown in item B of FIG. 1, the notification control device according to the embodiment selects, for example, as mentioned above, one image capturing mode from among the plurality of image capturing modes on the basis of one or more of the captured image indicated by the image signal, the information regarding the image capturing environment, and the voice signal. In addition, it goes without saying that examples according to selection of the image capturing mode in the case of being in the automatic setting mode are not limited to the above example.

The notification control device according to the embodiment uses, for example, a table as shown in FIG. 1, and thereby, specifies the notification way corresponding to the set operation mode and causes the determination result to be reported to the user in the specified notification way, for example, as mentioned above.

In addition, examples of the table used by the notification control device according to the embodiment in the notification control processing according to the embodiment are not limited to the examples shown in FIG. 1.

For example, in the table used for the notification control processing according to the embodiment, levels of the notification may further be set in the cases indicating ability of the notification (cases of "OK" shown in FIG. 1).

Examples of the levels of the notification according to the embodiment in the "visual notification way" include, for example, sizes of characters and images displayed on a display screen, colors and brightness of light emitted from a lamp, and the like. Moreover, examples of the levels of the notification according to the embodiment in the "auditory notification way" include, for example, volumes of voice, kinds of the voice, and the like. Moreover, examples of the levels of the notification according to the embodiment in the "tactile notification way" include, for example, magnitudes of vibration, ways of the vibration, and the like.

For example, in FIG. 1, "in zooming" shown in item B of FIG. 1 indicates that the notification in the "tactile notification way" shown in item F of FIG. 1 is not possible, whereas the notification in the "tactile notification way" shown in item F of FIG. 1 may be possible in "in zooming" shown in item B of FIG. 1.

Herein, the setting of "in zooming" in the table shown in FIG. 1 is an example of setting for which, for example, the person of setting who configures the table supposes that "the user using the image capturing device (one example of the target device according to the embodiment) performs image capturing conscious of the field of view, watching the display screen on which the captured image is displayed".

Also, the setting corresponding to the other operation modes in the table shown in FIG. 1 is, for example, examples of setting for which the person of setting who configures the table supposes the use cases. As one example, the setting of "silent place" in the table shown in FIG. 1 is an example for which, for example, the person of setting who configures the table supposes the "case where sound caused by vibration of a vibrator or the like is not desirable as well as the auditory notification with voice in a silent environment" and performs the setting such that the auditory notification with voice or the tactile notification with vibration is not caused to be performed. In addition, when the levels of the notification are set for the "auditory notification way" and the "tactile notification way", for example, "silent place" in the table shown in FIG. 1 can be set such that the auditory notification with voice and the tactile notification with vibration are caused to be performed at certain levels of the notification.

In other words, the association of the operation modes according to the embodiment with the notification ways according to the embodiment may be able properly to be set by the person of setting who configures the table as shown in FIG. 1, for example, on the basis of the kind of the target device according to the embodiment, the supposed use case of the target device according to the embodiment, and the like. Herein, examples of the person of setting according to the embodiment include, for example, a manufacturer of the target device according to the embodiment, a user of the target device according to the embodiment, a user of the notification control device according to the embodiment, and the like.

Moreover, the association of "whether or not the voice signal corresponding to voice collected by another sound collection unit that is not blocked is automatically recorded as a voice signal for monaural playback" shown in item G of FIG. 1 with the operation modes according to the embodiment may also be able properly to be set by the person of setting who configures the table as shown in FIG. 1 similarly to the above-mentioned association of the operation modes according to the embodiment with the notification ways according to the embodiment.

Moreover, the association of the operation modes according to the embodiment with the notification ways according to the embodiment and the association of "whether or not the voice signal corresponding to voice collected by another sound collection unit that is not blocked is automatically recorded as a voice signal for monaural playback" with the operation modes according to the embodiment may be, for example, fixed setting which is beforehand set or variable setting which can be properly set by the user or the like.

When being in the first operation mode is determined, the notification control device according to the embodiment performs the processing as mentioned above.

In addition, the processing in the case where being in the first operation mode is determined is not limited to the notification control processing according to the above-mentioned first example.

For example, the user can configure whether or not the "function in which the voice signal corresponding to voice collected by the other sound collection unit which is not blocked is automatically recorded as a voice signal for monaural playback" as shown in item G of FIG. 1 is used (ON/OFF of the function) and the notification control device according to the embodiment may perform the processing on the basis of the state of the function.

For example, when the "function in which the voice signal corresponding to voice collected by the other sound collection unit which is not blocked is automatically recorded as a voice signal for monaural playback" as shown in item G of FIG. 1 is set not to be used (when the function is set to be OFF or when the function is not included), the notification control device according to the embodiment performs the notification according to the configuration shown in items D to F of FIG. 1.

Moreover, for example, when the "function in which the voice signal corresponding to voice collected by the other sound collection unit which is not blocked is automatically recorded as a voice signal for monaural playback" as shown in item G of FIG. 1 is set to be used (when the function is set to be ON), the notification control device according to the embodiment can perform none of the notifications that are according to the configurations shown in items D to F of FIG. 1. In other words, in the above-mentioned case, the notification control device according to the embodiment determines that the user allows the voice signal for monaural playback to be recorded, and does not perform the notification.

For example, as mentioned above, when the notification is selectively performed on the basis of the state of the "function in which the voice signal corresponding to voice collected by the other sound collection unit which is not blocked is automatically recorded as a voice signal for monaural playback" as shown in item G of FIG. 1, the frequency of the notification performed for the user decreases. Therefore, in the above-mentioned case, since a risk that the user feels the notification annoying can be further reduced, the notification control device according to the embodiment can improve convenience of the user.

(2-2) Second Example of Notification Control Processing: Second Example of Notification Control Processing in Case where being in First Operation Mode is Determined For example, when the voice recording mode such as an "IC recorder function" shown in item C of FIG. 1 is set, the notification control device according to the embodiment determines being in the first operation mode. Then, the notification control device according to the embodiment causes the determination result to be reported to the user, for example, in the notification way corresponding to the voice recording mode. More specifically, in the above-mentioned case, the notification control device according to the embodiment causes the determination result to be reported to the user, for example, in the tactile notification way with vibration as shown in item C of FIG. 1.

In addition, the processing in the case where being in the first operation mode is determined is not limited to the above-mentioned notification control processing according to the second example.

For example, similarly to the above-mentioned notification control processing according to the first example, the notification control device according to the embodiment may selectively perform the notification on the basis of the state of the "function in which the voice signal corresponding to voice collected by the other sound collection unit which is not blocked is automatically recorded as a voice signal for monaural playback" as shown in item G of FIG. 1.

(2-3) Third Example of Notification Control Processing: Example of Notification Control Processing in Case where being in Second Operation Mode is Determined For example, when the "operation mode in which the operation state in which image capturing is performed by the image capturer but any captured image is not recorded is realized" shown in item A of FIG. 1 is set, the notification control device according to the embodiment determines being in the second operation mode. Then, when being in the second operation mode is determined, the notification control device according to the embodiment causes the determination result to be reported to the user, for example, in one or more notification ways from among the visual notification way, the auditory notification way and the tactile notification way with vibration as shown in item A of FIG. 1.

Herein, when being in the "operation mode in which the operation state in which image capturing is performed by the image capturer but any captured image is not recorded is realized" shown in item A of FIG. 1, recording of the captured image can be to start from now in high possibility. When being in the second operation mode is determined, the notification control device according to the embodiment causes the determination result to be reported to the user, for example, in the notification way as shown in item A of FIG. 1, and thereby, the case where the microphone is blocked is reported to the user before recording of the captured image starts.

Accordingly, when being in the second operation mode is determined, since the notification control device according to the embodiment causes the determination result to be reported to the user, for example, in the notification way as shown in item A of FIG. 1, and thereby, real time notification according to the case where the microphone is blocked can be further improved, thus, convenience of the user can be further improved.

In addition, the processing in the case where being in the second operation mode is determined is not limited to the above.

For example, similarly to the above-mentioned notification control processing according to the first example, the notification control device according to the embodiment may selectively perform the notification on the basis of the state of the "function in which the voice signal corresponding to voice collected by the other sound collection unit which is not blocked is automatically recorded as a voice signal for monaural playback" as shown in item G of FIG. 1.

(2-4) Fourth Example of Notification Control Processing

For example, when the microphone according to the embodiment has two sound collection units collecting the voice for stereophonic playback, as mentioned above, the notification control device according to the embodiment determines whether the sound collection unit is blocked for each sound collection unit in the microphone or determines whether any of the sound collection units in the microphone is blocked, in the above-mentioned processing of item (1) (determination processing).

As above-mentioned, when the microphone according to the embodiment has two sound collection units collecting the voice for stereophonic playback, in the case where it is determined that at least one sound collection unit of the two sound collection units in the microphone is blocked or it is determined that the two sound collection units are blocked, the notification control device according to the embodiment may cause the determination result to be reported to the user.

More specifically, for example, when the "function in which the voice signal corresponding to voice collected by the other sound collection unit which is not blocked is automatically recorded as a voice signal for monaural playback" as shown in item G of FIG. 1 is set (the function is set to be ON), even in the case where it is determined that one sound collection unit is blocked in the above-mentioned processing of item (1) (determination processing), the notification control device according to the embodiment does not cause the determination result to be reported to the user, for example, on the basis of the setting of function of "OK" shown in item G of FIG. 1. Moreover, in the case where the above-mentioned function is set to be ON, for example, regardless to the setting of the function, the notification control device according to the embodiment causes the determination result to be reported to the user when it is determined that the two sound collection units are blocked in the above-mentioned processing of item (1) (determination processing).

For example, as mentioned above, when it is determined that two sound collection units of the two sound collection units in the microphone are blocked in the above-mentioned processing of item (1) (determination processing), the notification control device according to the embodiment can cause the determination result to be reported to the user.

Moreover, for example, when the "function in which the voice signal corresponding to voice collected by the other sound collection unit which is not blocked is automatically recorded as a voice signal for monaural playback" as shown in item G of FIG. 1 is not set (when the function is set to be OFF or when the function is not included), the notification control device according to the embodiment causes the determination result to be reported to the user in the case where it is determined that the sound collection unit is blocked in the above-mentioned processing of item (1) (determination processing). Moreover, for example, even when the "function in which the voice signal corresponding to voice collected by the other sound collection unit which is not blocked is automatically recorded as a voice signal for monaural playback" as shown in item G of FIG. 1 is set (even when the function is set to be ON), for example, depending on the setting of function of "NG" in item G of FIG. 1, the notification control device according to the embodiment causes the determination result to be reported to the user in the case where it is determined that the sound collection unit is blocked in the above-mentioned processing of item (1) (determination processing).

For example, as mentioned above, when it is determined that at least one sound collection unit of the two sound collection units in the microphone is blocked in the above-mentioned processing of item (1) (determination processing), the notification control device according to the embodiment can cause the determination result to be reported to the user.

For example, the notification control device according to the embodiment performs the notification control processing according to the first example to the notification control processing according to the fourth example mentioned above as the notification control processing according to the embodiment. In addition, it goes without saying that examples of the notification control processing according to the embodiment are not limited to the notification control processing according to the first example to the notification control processing according to the fourth example mentioned above For example, the notification control device according to the embodiment performs the processing of item (1) (determination processing) and the processing of item (2) (notification control processing) as mentioned above as the processing according to the notification control method according to the embodiment.

(Notification Control Device According to Embodiment)

Next, one exemplary configuration of a notification control device according to the embodiment which can perform the above-mentioned processing according to the notification control method according to the embodiment is described. Hereafter, one exemplary configuration of the notification control device according to the embodiment is described, exemplified by the notification control device according to the embodiment integrated with the target device according to the embodiment into one device.

Figure 2:
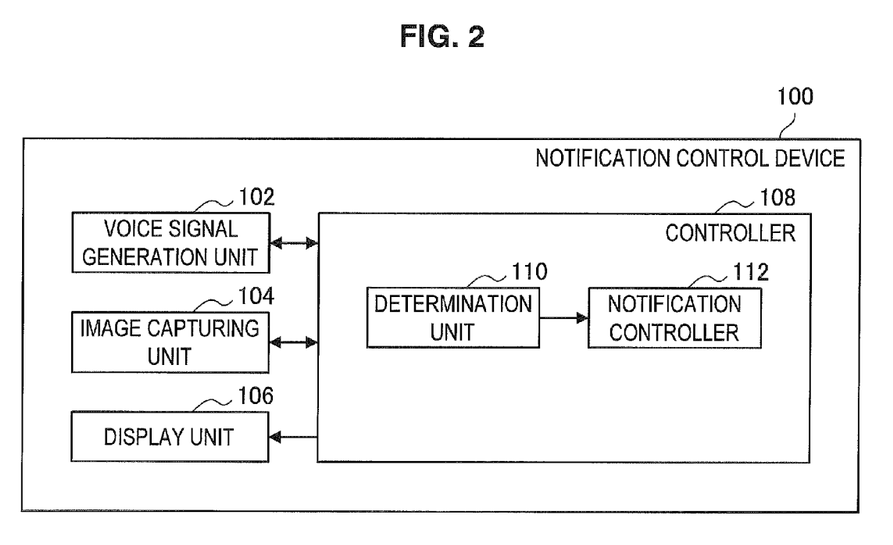
FIG. 2 is a block diagram illustrating one example of a configuration of the notification control device according to the embodiment.

FIG. 2 is a block diagram showing one example of a configuration of a notification control device 100 according to the embodiment. The notification control device 100 includes, for example, a voice signal generation unit 102, an image capturing unit 104, a display unit 106 and a controller 108.

Moreover, the notification control device 100 may include, for example, a ROM (Read Only Memory; not shown), a RAM (Random Access Memory; not shown), a storage (not shown), a manipulation unit which the user can manipulate (not shown), a communication unit communicable with an external device in a wireless/wired manner (not shown), and the like. In the notification control device 100, the above-mentioned constituents are connected to one another, for example, with a bus as a propagation path of data Herein, the ROM (not shown) stores control data such as a program and operation parameters used by the controller 108. The RAM (not shown) temporarily stores a program and the like executed by the controller 108.

The storage (not shown) is a storage mechanism included in the notification control device 100 and stores, for example, various data such as data indicating display objects and applications. Herein, examples of the storage (not shown) include, for example, a magnetic recording medium such as a hard disk drive, a non-volatile memory such as an EEPROM (Electrically Erasable and Programmable Read Only Memory) and a flash memory, and the like. Moreover, the storage (not shown) may be detachably attached to the notification control device 100.

Examples of the manipulation unit (not shown) include, for example, a manipulation input device mentioned later.

The communication unit (not shown) is a communication mechanism included in the notification control device 100 and communicates with an external device such as a server via a network (or directly) in a wireless/wired manner. Moreover, in the communication unit (not shown), its communication is controlled, for example, by the controller 108.

Herein, examples of the communication unit (not shown) include, for example, a communication antenna and an RF (Radio Frequency) circuit (wireless communication), an IEEE 802.15.1 port and a transceiver circuit (wireless communication), an IEEE 802.11b port and a transceiver circuit (wireless communication), a LAN (Local Area Network) terminal and a transceiver circuit (wired communication), and the like. Moreover, examples of the network according to the embodiment include, for example, a wired network such as a LAN and a WAN (Wide Area Network), a wireless network such as a wireless LAN (WLAN; Wireless Local Area Network) and a wireless WAN (WWAN; Wireless Wide Area Network) via a base station, the Internet using a communication protocol such as TCP/IP (Transmission Control Protocol/Internet Protocol), and the like.

[Hardware Configuration Example of Notification Control Device 100]

Figure 3:
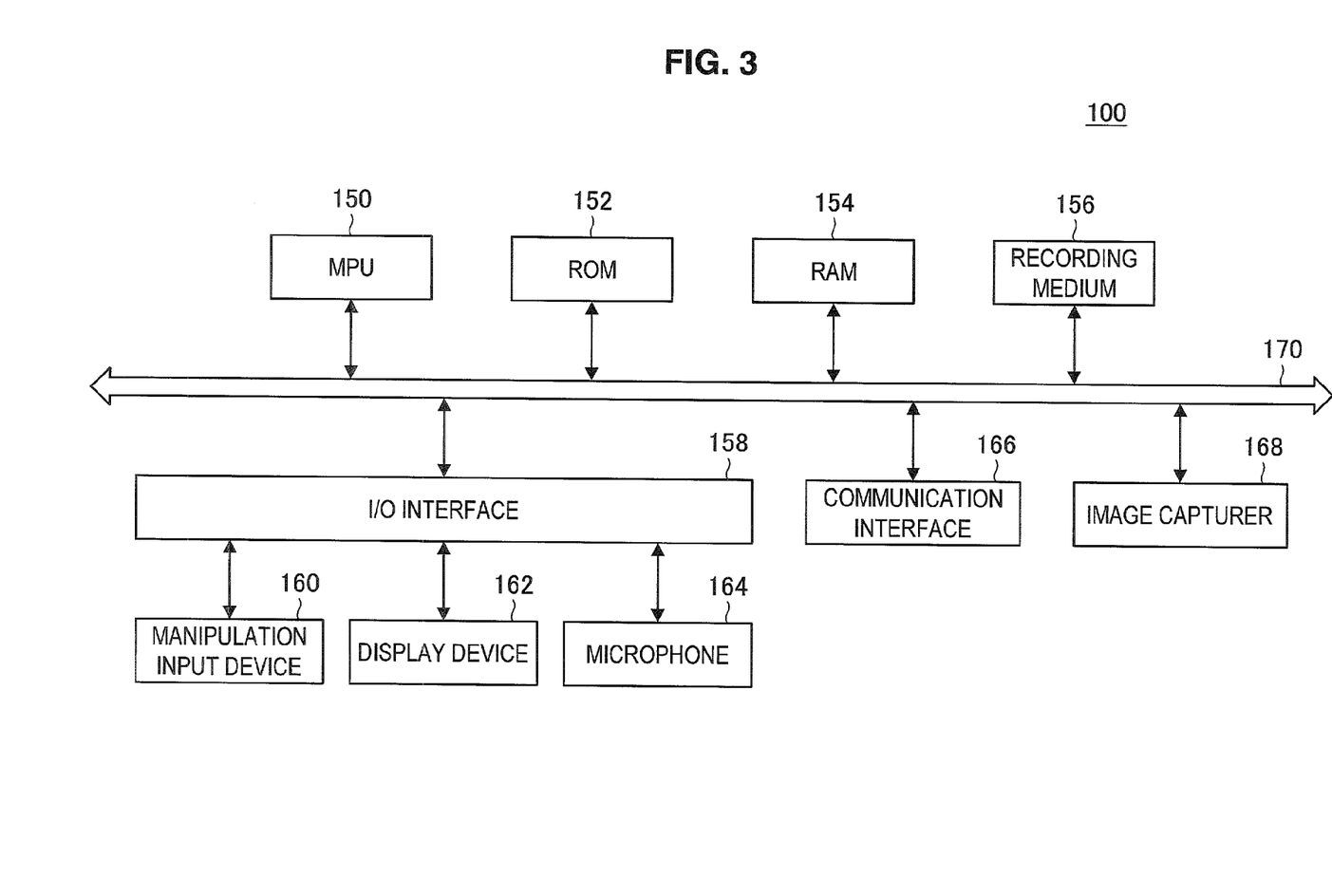
FIG. 3 is an explanatory drawing illustrating one example of hardware configuration of the notification control device according to the embodiment.

FIG. 3 is an explanatory drawing of showing one example of a hardware configuration of the notification control device 100 according to the embodiment. The notification control device 100 includes, for example, an MPU 150, a ROM 152, a RAM 154, a recording medium 156, an I/O interface 158, a manipulation input device 160, a display device 162, a microphone 164, a communication interface 166 and an image capturer 168. Moreover, in the notification control device 100, the constituents are connected to one another, for example, with a bus 170 as a propagation path of data.

The MPU 150 is constituted, for example, of an MPU, various processing circuits and the like and functions as the controller 108 controlling the entirety of the notification control device 100. Moreover, the MPU 150 plays a role, for example, of the determination unit 110 and the notification controller 112, mentioned later, in the notification control device 100.

The ROM 152 stores control data such as a program used by the MPU 150 and operation parameters, and the like. The RAM 154 temporarily stores, for example, a program and the like executed by the MPU 150.

The recording medium 156 functions as the storage (not shown) and stores various data such as the table data as shown in FIG. 1, for example, data according to the notification such as image data indicating the content of the notification, applications. Herein, examples of the recording medium 156 include, for example, a magnetic recording medium such as a hard disk drive and a non-volatile memory such as a flash memory. Moreover, the recording medium 156 may be detachably attached to the notification control device 100.

The I/O interface 158 connects, for example, the operation input device 160, the display device 162 and the microphone 164 to one another. The operation input device 160 functions as the manipulation unit (not shown). Moreover, the display device 162 functions as the display unit 164. Moreover, the microphone 166 functions as the voice signal generation unit 102 and collects voice to generate voice signals indicating the collected voice.

Herein, examples of the I/O interface 158 include, for example, a USB (Universal Serial Bus) terminal, a DVI (Digital Visual Interface) terminal, an HDMI (High-Definition Multimedia Interface) terminal, various processing circuits, and the like.

Moreover, the operation input device 160 is provided, for example, on the notification control device 100 and connected to the I/O interface 158 inside the notification control device 100. Examples of the operation input device 160 include, for example, buttons, direction keys, a rotational selector such as a jog dial, a combination of these, and the like.

Moreover, the display device 162 is provided, for example, on the notification control device 100 and connected to the I/O interface 158 inside the notification control device 100. Examples of the display device 162 include, for example, a liquid crystal display (Liquid Crystal Display), an organic EL display (Organic Electro-Luminescence display; also referred to as OLED display (Organic Light Emitting Diode display)), and the like.

Moreover, the microphone 166 is provided, for example, on the notification control device 100 and connected to the notification control device 100 inside the I/O interface 158. Examples of the microphone 166 include, for example, microphones of any types such as a dynamic microphone and a condenser microphone which can collect voice to generate voice signals indicating the collected voice.

In addition, it goes without saying that the I/O interface 158 can also be connected to the manipulation input device as an external device of the notification control device 100 (for example, a keyboard, a mouse or the like) and an external device such as a display device and a microphone. Moreover, the display device 162 may be a device such, for example, as a touch screen which can be allowed user manipulation as well as displaying.

The communication interface 166 is a communication mechanism included in the notification control device 100 and functions as the communication unit (not shown) for communicating with an external device such as the display device according to the embodiment via a network (or directly) in a wireless/wired manner. Herein, examples of the communication interface 166 include, for example, a communication antenna and an RF circuit (wireless communication), an IEEE 802.15.1 port and a transceiver circuit (wireless communication), an IEEE802.11b port and a transceiver circuit (wireless communication), a LAN terminal and a transceiver circuit (wired communication), and the like.

The image capturer 168 functions as the image capturing unit (not shown) capturing a still image or a moving image and generates an image signal indicating the captured image. Herein, examples of the image capturer 168 include, for example, a lens/image sensor and signal processing circuits. The lens/image sensor is constituted, for example, of a lens of the optical system and an image sensor using a plurality of imaging elements including, for example, CMOS (Complementary Metal Oxide Semiconductor). Moreover, the signal processing circuits include, for example, an AGC (Automatic Gain Control) circuit and an ADC, and convert the analog signal generated by the image sensor into a digital signal (image data) to perform various kinds of signal processing. Examples of the signal processing performed by the signal processing circuits, for example, white balance correction processing, color tone correction processing, gamma correction processing, YCbCr conversion processing, edge enhancement processing and the like.

The notification control device 100 performs the processing according to the notification control method according to the embodiment, for example, with the configuration shown in FIG. 3. In addition, a hardware configuration of the notification control device 100 according to the embodiment is not limited to the configuration shown in FIG. 3.

For example, the notification control device 100 may include a plurality of communication interfaces with different communication formats or with the same communication format.

For example, when the notification control device 100 communicates with an external device such as the display device according to the embodiment via an external communication device which is connected thereto via the I/O interface 158 or the like or when it performs the processing in a stand-alone manner, it may include none of the communication interface 166.

Moreover, the notification control device 100 may further include a sensor such, for example, as an infrared proximity sensor which can detect an object body close to the sound collection unit of the microphone according to the embodiment. Moreover, the notification control device 100 may further include, for example, a vibration device such as a vibrator which functions as the vibration unit (not shown). Moreover, the notification control device 100 may further include, for example, a loud speaker or the like which functions as the voice output unit (not shown).

Moreover, the notification control device 100 can employ a configuration, for example, not including a manipulation device 160, a display device 162 or an image capturer 168.

Referring to FIG. 2 again, one exemplary configuration of the notification control device 100 is described. The voice signal generation unit 102 collects voice to generate a voice signal indicating the voice. Moreover, the generation of the voice signal in the voice signal generation unit 102 is controlled, for example, by the controller 108.

Herein, examples of the voice signal generation unit 102 include, for example, microphones of any types such as a dynamic microphone and a condenser microphone which can collect voice to generate a voice signal indicating the voice.

The image capturing unit 104 captures a still image or a moving image and generates an image signal indicating the captured image. Moreover, the image capturing in the image capturing unit 104 is controlled, for example, by the controller 108.

Herein, examples of the image capturing unit 104 include, for example, a lens/image sensor and signal processing circuits.

The display unit 106 displays, on the display screen, various screens such, for example, as a screen on which an image such as the captured image by the image capturing unit 104 is displayed, a manipulation screen which allows the user to perform desired manipulation, and a screen in which display according to the notification according to the embodiment is performed. Moreover, the display by the display unit 106 is controlled, for example, on the basis of a signal indicating the display content delivered from the controller 108, and a control signal indicating display timing and the like.

Herein, examples of the display unit 106 include, for example, a liquid crystal display, an organic EL display and the like.

The controller 108 is constituted, for example, of an MPU and plays a role of controlling the entirety of the notification control device 100. Moreover, the controller 108 includes, for example, the determination unit 110 and the notification controller 112 and plays a role of predominantly performing the processing according to the notification control method according to the embodiment.

The determination unit 110 plays a role of predominantly performing the above-mentioned processing of item (1) (determination processing) to determine whether the sound collection unit in the microphone (for example, the voice signal generation unit 102 shown in FIG. 2 or a microphone as an external device) is blocked.

More specifically, the determination unit 110 determines whether the sound collection unit in the microphone is blocked, for example, in any of the above-mentioned determination processing according to the first example, the above-mentioned determination processing according to the second example and the above-mentioned determination processing according to the third example as described in the above-mentioned item (1-1) to the above-mentioned item (1-3).

The notification controller 112 plays a role of predominantly performing the above-mentioned processing of item (2) (notification control processing), and causes the determination result to be reported to the user when the determination that the sound collection unit of the microphone is blocked is made in the determination unit 110. The notification controller 112 causes the determination result to be reported to the user, for example, in one or more notification ways not including the auditory notification way when the voice signal indicating the voice collected by the microphone. Moreover, the notification controller 112 causes the determination result to be reported to the user, for example, in one or more notification ways from among one or more notification ways including the auditory notification way when the voice signal is not recorded.

More specifically, the notification controller 112 causes the determination result to be reported to the user, for example, in any of the above-mentioned notification control processing according to the first example, the above-mentioned notification control processing according to the second example, the above-mentioned notification control processing according to the third example, and the above-mentioned notification control processing according to the fourth example as described in the above-mentioned item (2-1) to the above-mentioned item (2-4). For example, the notification controller 112 specifies the notification way corresponding to the set operation mode by using the table, as shown in FIG. 1, in which the operation modes are associated with the notification ways, and causes the determination result to be reported to the user in the specified notification way.

The controller 108 includes, for example, the determination unit 110 and the notification controller 112, and thereby, predominantly performs the processing according to the notification control method according to the embodiment.

The notification control device 100 performs the processing according to the notification control method according to the embodiment (for example, the above-mentioned processing of item (1) (determination processing) and the above-mentioned processing of item (2) (notification control processing)), for example, with the configuration shown in FIG. 2.

Accordingly, the notification control device 100 can improve convenience of the user, for example, with the configuration shown in FIG. 2.

Incidentally, the configuration of the notification control device according to the embodiment is not limited to the configuration shown in FIG. 2.

For example, the notification control device according to the embodiment can include one or more of the determination unit 110 and the notification controller 112 shown in FIG. 2 separate from the controller 108 (for example, to implement them with a separate processing circuit).

For example, the notification control device according to the embodiment does not have to include the sound collection unit 102 when the notification control device according to the embodiment processes the voice signal generated by the microphone as an external device, or when the notification control device according to the embodiment is a device separate from the target device according to the embodiment. Still in the case of the sound collection unit 102 not included, the notification control device according to the embodiment can perform the above-mentioned processing of item (1) (determination processing) and the above-mentioned processing of item (2) (notification control processing) which are according to the notification control method according to the embodiment, for example. Therefore, still in the case of the sound collection unit 102 not included, the notification control device according to the embodiment can improve convenience of the user similarly to the configuration shown in FIG. 2.

For example, when the notification control device according to the embodiment is a device separate from the target device according to the embodiment, the notification control device according to the embodiment may further include the communication unit (not shown) communicable with an external device such as the target device according to the embodiment and a server.

For example, the notification control device according to the embodiment may further include the vibration unit (not shown) capable of performing the vibration according to the notification and/or the voice output unit (not shown) capable of outputting the voice according to the notification. Herein, examples of the vibration unit (not shown) according to the embodiment include, for example, a vibration device such as a vibrator. Moreover, examples of the voice output unit (not shown) according to the embodiment include, for example, a voice output device such as a loud speaker.

For example, the notification control device according to the embodiment may have a configuration in which the image capturing unit 104 and/or the display unit 106 shown in FIG. 2 are not included. Still in the case of the image capturing unit 104 and/or the display unit 106 not included, the notification control device according to the embodiment can perform the above-mentioned processing of item (1) (determination processing) and the above-mentioned processing of item (2) (notification control processing) which are according to the notification control method according to the embodiment, for example. Therefore, still in the case of the image capturing unit 104 and/or the display unit 106 not included, the notification control device according to the embodiment can improve convenience of the user similarly to the configuration shown in FIG. 2.

As above, the notification control device according to the embodiment performs the above-mentioned processing of item (1) (determination processing) and the above-mentioned processing of item (2) (notification control processing) as the processing according to the notification control method according to the embodiment, for example.

Herein, the notification control device according to the embodiment causes the determination result to be reported to the user in the above-mentioned processing of item (2) (notification control processing), when it is determined that the sound collection unit of the microphone is blocked in the above-mentioned processing of item (1) (determination processing). The notification control device according to the embodiment causes the determination result to be reported to the user when it is determined that the sound collection unit of the microphone is blocked, and thereby, the user can recognize, for example, the case where the microphone is blocked and can perform the operation changing the state where the microphone is blocked to the state where the microphone is not blocked.

Therefore, the notification control device according to the embodiment performs the processing according to the notification control method according to the embodiment, and thereby, for example, the above-mentioned undesirable case can be prevented from taking place and influence of the above-mentioned undesirable case can be reduced.

Moreover, the notification control device according to the embodiment changes the notification way depending on the case where the voice signal is recorded or the case where the voice signal is not recorded. More specifically, the notification control device according to the embodiment does not cause the determination result to be reported to the user in the auditory notification way, for example, when the voice signal is recorded. Therefore, when the notification is performed by the notification control device according to the embodiment, since it is prevented that the voice indicated by the recorded voice signal is contaminated by the voice according to the notification, there is not a risk that reporting the case where the microphone is blocked to the user all the more causes the user inconvenience.

Moreover, the notification control device according to the embodiment specifies the notification way corresponding to the set operation mode, for example, by using the table in which the operation modes are associated with the notification ways as shown in FIG. 1, and causes the determination result to be reported to the user in the specified notification way. Therefore, the notification control device according to the embodiment can cause the determination result to be reported to the user, for example, in the notification way which meets the circumstance corresponding to the operation mode (for example, the circumstance of usage of the target device according to the embodiment or the circumstance corresponding to the environment of usage of the target device according to the embodiment).

Accordingly, the notification control device according to the embodiment can improve convenience of the user.

As above, the embodiment is described, exemplified by the notification control device, whereas the embodiment is not limited to such a mode. The embodiment can be applied, for example, to various devices (electronic devices) such as an image capturing device such as a digital still camera and a digital video camera, a voice recording device such as an IC recorder, a tablet-type device, a communication device such as a mobile phone and a smart phone, a video/music playback device (or video/music recording/playing-back device), a game machine, and a computer such as a PC (Personal Computer). Moreover, the embodiment can also be applied to a processing IC (Integrated Circuit) which can be implemented in the above-mentioned devices, for example.

(Program According to Embodiment)

A program for causing a computer to function as the notification control device according to the embodiment (for example, a program capable of performing the processing according to the notification control method according to the embodiment such as the above-mentioned processing of item (1) (determination processing) and the above-mentioned processing of item (2) (notification control processing)) is executed in a computer, and thereby, convenience of the user can be improved.

It should be understood by those skilled in the art that various modifications, combinations, sub-combinations and alterations may occur depending on design requirements and other factors insofar as they are within the scope of the appended claims or the equivalents thereof.

For example, in the above, it is described that the program (computer program) for causing a computer to function as the notification control device according to the embodiment is provided, whereas the embodiment can further provide a storage medium in which the above-mentioned program is stored as well.

The above-mentioned configurations exemplary show the embodiment and fall under the technical scope of an embodiment of the present disclosure in the nature of things.

Additionally, the present technology may also be configured as below.

(1) A notification control device including:
a determination unit configured to determine whether a sound collection unit configured to collect voice in a microphone is blocked; and
a notification controller configured to cause, when it is determined that the sound collection unit of the microphone is blocked, a determination result to be reported to a user,
wherein, when a voice signal indicating the voice collected by the microphone is recorded, the notification controller causes the determination result to be reported to the user in one or more notification ways not including an auditory notification way, and
wherein, when the voice signal is not recorded, the notification controller causes the determination result to be reported to the user in one or more notification ways from among one or more notification ways including the auditory notification way.

(2) The notification control device according to (1),
wherein the notification controller determines which of a first operation mode in which the voice signal is recorded or a second operation mode in which the voice signal is not recorded is set,
wherein, when it is determined that the first operation mode is set, the notification controller causes the determination result to be reported to the user in the one or more notification ways not including the auditory notification way, and
wherein, when it is determined that the second operation mode is set, the notification controller causes the determination result to be reported to the user in the one or more notification ways from among the one or more notification ways including the auditory notification way.

(3) The notification control device according to (2),
wherein the first operation mode includes one or more image capturing modes in which the voice signal is recorded along with an image signal indicating a captured image captured by an image capturer, and
wherein, when one of the image capturing modes is set, the notification controller determines that the first operation mode is set, and
wherein the notification controller causes the determination result to be reported to the user in a notification way corresponding to the set image capturing mode.

(4) The notification control device according to (3),
wherein when the set image capturing mode is a person image capturing mode in which an image of a person is captured or a scenery image capturing mode in which an image of scenery is captured,
the notification controller causes the determination result to be reported to the user in a visual notification way and/or a tactile notification way with vibration.

(5) The notification control device according to (3) or (4),
wherein, when the set image capturing mode is not a person image capturing mode in which an image of a person is captured or a scenery image capturing mode in which an image of scenery is captured,
the notification controller causes the determination result to be reported to the user in a visual notification way.

(6) The notification control device according to any one of (3) to (5),
wherein the first operation mode includes an automatic setting mode in which one image capturing mode is automatically set from among a plurality of the image capturing modes, and
wherein, when the automatic setting mode is set, the notification controller causes the determination result to be reported to the user in the notification way corresponding to the one image capturing mode from among the plurality of image capturing modes on the basis of one or more of the captured image indicated by the image signal, information regarding an image capturing environment in which image capturing is performed by the image capturer, and the voice signal.

(7) The notification control device according to any one of (2) to (6), wherein the first operation mode includes a voice recording mode in which only the voice signal is recorded, and wherein, when the voice recording mode is set, the notification controller determines that the first operation mode is set, and wherein the notification controller causes the determination result to be reported to the user in a notification way corresponding to the set voice recording mode.

(8) The notification control device according to (7), wherein, when the voice recording mode is set, the notification controller causes the determination result to be reported to the user in a tactile notification way with vibration.

(9) The notification control device according to any one of (2) to (8), wherein, when it is determined that the second operation mode is set, the notification controller causes the determination result to be reported to the user in one or more notification ways from among a visual notification way, the auditory notification way and a tactile notification way with vibration.

(10) The notification control device according to any one of (1) to (9), wherein, when the microphone includes the two sound collection units configured to collect voice for stereophonic playback, the determination unit determines whether each sound collection unit is blocked for each sound collection unit in the microphone or determines which of the sound collection units in the microphone is blocked, and wherein, when it is determined that at least one of the two sound collection units in the microphone is blocked, or when it is determined that the two sound collection units are blocked, the notification controller causes the determination result to be reported to the user.

(11) A notification control method including:

determining whether a sound collection unit configured to collect voice in a microphone is blocked; and causing, when it is determined that the sound collection unit of the microphone is blocked, a determination result to be reported to a user, wherein in the step of causing the determination result to be reported, when a voice signal indicating the voice collected by the microphone is recorded, the determination result is caused to be reported to the user in one or more notification ways not including an auditory notification way, and when the voice signal is not recorded, the determination result is caused to be reported to the user in one or more notification ways from among one or more notification ways including the auditory notification way.

(12) A program for causing a computer to execute:

determining whether a sound collection unit configured to collect voice in a microphone is blocked; and causing, when it is determined that the sound collection unit of the microphone is blocked, a determination result to be reported to a user, wherein in the step of causing the determination result to be reported, when a voice signal indicating the voice collected by the microphone is recorded, the determination result is caused to be reported to the user in one or more notification ways not including an auditory notification way, and when the voice signal is not recorded, the determination result is caused to be reported to the user in one or more notification ways from among one or more notification ways including the auditory notification way.

What is claimed is:

1. A notification control device comprising:
    a determination unit configured to determine whether a sound collection unit configured to collect voice in a microphone is blocked; and
    a notification controller configured to:
        cause, in an event it is determined that the sound collection unit of the microphone is blocked, a determination result to be reported to a user, and
        determine which of a first operation mode in which a voice signal indicating the voice collected by the microphone is recorded or a second operation mode in which the voice signal is not recorded is set,
    wherein, in an event the first operation mode in which the voice signal indicating the voice collected by the microphone is recorded is set, the notification controller is configured to cause the determination result to be reported to the user in one or more notification ways not including an auditory notification way, and
    wherein, in an event the second operation mode in which the voice signal is not recorded is set, the notification controller is configured to cause the determination result to be reported to the user in one or more notification ways from among one or more notification ways including the auditory notification way.

2. The notification control device according to claim 1,
    wherein the first operation mode includes a plurality of image capturing modes in which the voice signal is recorded along with an image signal indicating a captured image captured by an image capturer, and
    wherein, in an event one of the plurality of the image capturing modes is set, the notification controller is configured to determine that the first operation mode is set, and
    wherein the notification controller is configured to cause the determination result to be reported to the user in a notification way corresponding to the set image capturing mode.

3. The notification control device according to claim 2,
    wherein in an event the set image capturing mode is a person image capturing mode in which an image of a person is captured or a scenery image capturing mode in which an image of scenery is captured, the notification controller is configured to cause the determination result to be reported to the user in a visual notification way and/or a tactile notification way with vibration.

4. The notification control device according to claim 2,
    wherein, in an event the set image capturing mode is not a person image capturing mode in which an image of a person is captured or a scenery image capturing mode in which an image of scenery is captured, the notification controller is configured to cause the determination result to be reported to the user in a visual notification way.

5. The notification control device according to claim 1,
wherein the first operation mode includes an automatic setting mode in which one image capturing mode is automatically set from among a plurality of image capturing modes, and
wherein, in an event the automatic setting mode is set, the notification controller is configured to cause the determination result to be reported to the user in the notification way corresponding to the one image capturing mode from among the plurality of the image capturing modes based on one or more of the captured image indicated by an image signal indicating a captured image captured by an image capturer, information regarding an image capturing environment in which image capturing is performed by the image capturer, and the voice signal.

6. The notification control device according to claim 1,
wherein the first operation mode includes a voice recording mode in which only the voice signal is recorded, and
wherein, in an event the voice recording mode is set, the notification controller is configured to determine that the first operation mode is set, and
wherein the notification controller is configured to cause the determination result to be reported to the user in a notification way corresponding to the set voice recording mode.

7. The notification control device according to claim 6,
wherein, in an event the voice recording mode is set, the notification controller is configured to cause the determination result to be reported to the user in a tactile notification way with vibration.

8. The notification control device according to claim 1,
wherein, in an event it is determined that the second operation mode is set, the notification controller is configured to cause the determination result to be reported to the user in one or more notification ways from among a visual notification way, the auditory notification way and a tactile notification way with vibration.

9. The notification control device according to claim 1,
wherein, in an event the microphone includes the two sound collection units configured to collect voice for stereophonic playback, the determination unit is configured to determine which of the sound collection units in the microphone is blocked, and
wherein, in an event it is determined that at least one of the two sound collection units in the microphone is blocked, the notification controller is configured to cause the determination result to be reported to the user.

10. A notification control method comprising:
determining whether a sound collection unit configured to collect voice in a microphone is blocked;
causing, in an event it is determined that the sound collection unit of the microphone is blocked, a determination result to be reported to a user, and
determining which of a first operation mode in which a voice signal indicating the voice collected by the microphone is recorded or a second operation mode in which the voice signal is not recorded is set,
wherein in the step of causing the determination result to be reported,
in an event the first operation mode in which the voice signal indicating the voice collected by the microphone is recorded is set, the determination result is caused to be reported to the user in one or more notification ways not including an auditory notification way, and
in an event the second operation mode in which the voice signal is not recorded is set, the determination result is caused to be reported to the user in one or more notification ways from among one or more notification ways including the auditory notification way.

11. A non-transitory computer-readable storage medium having stored thereon a set of computer-executable instructions that when executed by a computer causes the computer to perform steps comprising:
determining whether a sound collection unit configured to collect voice in a microphone is blocked;
causing, in an event it is determined that the sound collection unit of the microphone is blocked, a determination result to be reported to a user; and
determining which of a first operation mode in which a voice signal indicating the voice collected by the microphone is recorded or a second operation mode in which the voice signal is not recorded is set,
wherein in the step of causing the determination result to be reported,
in an event the first operation mode in which the voice signal indicating the voice collected by the microphone is recorded is set, the determination result is caused to be reported to the user in one or more notification ways not including an auditory notification way, and
in an event the second operation mode in which the voice signal is not recorded is set, the determination result is caused to be reported to the user in one or more notification ways from among one or more notification ways including the auditory notification way.

12. The notification control device according to claim 1, wherein the determination unit is further configured to determine whether the sound collection unit of the microphone is blocked on the basis of a detection signal of a sensor configured to detect an object blocking the sound collection unit of the microphone.

* * * * *